US006952013B2

(12) United States Patent
Granger et al.

(10) Patent No.: US 6,952,013 B2
(45) Date of Patent: Oct. 4, 2005

(54) ELECTROCHEMISTRY WITH POROUS FLOW CELL

(75) Inventors: Michael C. Granger, Northborough, MA (US); Gary J. Van Berkel, Clinton, TN (US)

(73) Assignees: ESA Biosciences, Inc., Chelmsford, MA (US); UT—Battelle, LLC, Oak Ridge, TN (US)

(*) Notice: Subject to any disclaimer, the term of this patent is extended or adjusted under 35 U.S.C. 154(b) by 0 days.

(21) Appl. No.: 10/849,098

(22) Filed: May 19, 2004

(65) Prior Publication Data

US 2004/0245457 A1 Dec. 9, 2004

Related U.S. Application Data

(60) Provisional application No. 60/476,544, filed on Jun. 6, 2003.

(51) Int. Cl.[7] .......................... H01J 49/10; H01J 49/04; B01D 59/44

(52) U.S. Cl. ....................... 250/288; 250/281; 250/282; 204/435; 436/161

(58) Field of Search ................................ 250/288, 281, 250/282; 204/435; 436/161

(56) References Cited

U.S. PATENT DOCUMENTS

| | | | | |
|---|---|---|---|---|
| 4,552,013 A | | 11/1985 | Matson | 73/61.1 |
| 4,861,988 A | | 8/1989 | Henion et al. | 290/288 |
| 5,223,226 A | | 6/1993 | Wittmer et al. | 422/100 |
| 5,879,949 A | * | 3/1999 | Cole et al. | 436/173 |
| 5,975,426 A | | 11/1999 | Myers | 293/3 |
| 6,452,166 B1 | | 9/2002 | Enke et al. | 250/288 |
| 6,475,799 B1 | | 11/2002 | Matson | 436/8 |
| 6,719,888 B1 | * | 4/2004 | Chan et al. | 204/435 |
| 2003/0015656 A1 | | 1/2003 | Van Berkel | 250/288 |
| 2003/0062475 A1 | * | 4/2003 | Karst et al. | 250/288 |

OTHER PUBLICATIONS

Bökman, et al.; A Setup for the Coupling of a Thin–Layer Electrochemical Flow Cell to Electrospray Mass Spectrometry; Analytical Chemistry, vol. 76, No. 7, Apr. 1, 2004 pp. 2017–2024.

Diehl, et al.; On–line Electrochemistry—MS and Related Techniques; Anal Bioanal Chem (2002) 373:390–398.

Fernandez de la Mora, et al; Electrochemical Processes in Electrospray Ionization Mass Spectrometry; Journal of Mass Spectrometry; 35, pp. 939–952 (2000).

Li et al; Mapping of Potential Gradients Within the Electrospray Emitter; Analytical Chemistry, vol. 75, No. 24, Dec. 15, 2003, pp. 6987–6994.

Van Berkel, et al; Controlling Analyte Electrochemistry in an Electrospray Ion Source with a Three–Electrode Emitter Cell; Analytical Chemistry, vol. 76, No. 5, Mar. 1, 2004 pp. 1493–1499.

Van Berkel et al.; Enchanced Study and Control of Analyte Oxidation in Electrospray Using a Thin–Channel, Planar Electrode Emitter; Analytical Chemistry, Oct. 1, 2002, vol. 74, No. 19 pp. 5047–5056.

Xu, et al.; On–Line Prode for Fast Electrochemistry/Electrospray Mass Spectrometry. Investigation of Polycyclic Aromatic Hydrocarbons; Analytical Chemistry, Dec. 1, 1996, vol. 68, No. 23, pp. 4244–4253.

* cited by examiner

*Primary Examiner*—Nikita Wells
(74) *Attorney, Agent, or Firm*—Scott E. Kamholz; Foley Hoag LLP

(57) ABSTRACT

Disclosed are systems and methods that include a flow-cell that includes porous conductive material(s) that provides a working electrode(s), an inlet connected to the flow-cell to deliver a solution continuing an analyte(s), an outlet connected to the flow-cell to allow the solution to exit the flow-cell, a counter electrode positioned proximate to the outlet, and a voltage source(s) coupled to the working electrode(s) and the counter electrode. The methods can include delivering a solution containing an analyte(s) through an inlet to a flow-cell that includes porous conductive material(s) that provides a working electrode(s), connecting the flow-cell to an outlet for allowing the solution to exit the flow-cell, placing a counter-electrode proximate the outlet, and supplying a voltage from a voltage source(s) to the working electrode(s) and/or the counter-electrode.

71 Claims, 9 Drawing Sheets

802 —— *m/z* 150
804 —— *m/z* 152
806 —— *m/z* 154
– – cell current

ELECTROCHEMISTRY WITH POROUS FLOW CELL

CROSS REFERENCE TO RELATED APPLICATIONS

This application is related to and claims the benefit of U.S. Provisional Application Ser. No. 60/476,544, filed on Jun. 6, 2003, and entitled "Porous Electrospray Emitter".

BACKGROUND (1) Field

The disclosed methods and systems relate generally to electrostatic spray devices, and more particularly to an electrospray ion source assembly using a porous electrochemical flow-cell.

(2) Description of Relevant Art

The electrospray (ES) process generally includes flowing a sample liquid into an electrospray ion source comprising a small tube or capillary which is maintained at a high voltage, in absolute value terms, with respect to a nearby surface. The liquid introduced into the tube or capillary is dispersed and emitted as fine electrically charged droplets (plume) by an electrical field between the tube and the surface. The ionization mechanism generally involves the desorption at atmospheric pressure of ions from the fine electrically charged particles. The ions created by the electrospray process can then be used for a variety of applications, such as mass analysis in a mass spectrometer.

The electrospray ion source operates electrolytically in a fashion analogous to a two-electrode controlled current (CCE) flow cell, effectively forming an electrochemical cell in a series circuit A metal capillary or other conductive contact (usually stainless steel) placed at or near the point from which the charged ES droplet plume is generated (the ES emitter) acts as the working electrode in the system.

One issue with conventional electrospray systems is that the electrochemical reactions (e.g., electrolysis reactions) that take place in the electrospray (ES) emitter can influence the gas-phase ions formed and ultimately analyzed by the mass spectrometer, because they may change the composition of the solution from that which initially enters the ion source to include unwanted ionized compounds (e.g., analytes). These changes include, but are not limited to, analyte electrolysis resulting in ionization of neutral analytes or modification in the mass or charge of the original analyte present in solution, changes in solution pH through electrolytic $H^+$or $OH^-$production/elimination, and/or the introduction/elimination of specific species to/from solution (e.g., introduction of $Fe^{2+,}$ ions from corrosion of a stainless steel emitter).

Another issue with conventional electrospray systems is that the compounds (e.g., analytes) most amenable to ionization through the electrospray process (and thus most amenable to analysis through the ES process) are ionic compounds, and/or compounds that can be ionized through acid/base reactions. Other compounds, such as neutral and non-polar compounds may not as readily be ionized by the ES process, and thus may not be easily processed and analyzed using apparatus and techniques that require that the compounds to be analyzed be ionized and electrosprayed.

Yet another concern with conventional ES systems relates to controlling the potential of the emitter electrode. As the system is a CCE process, the emitter potential is dictated by solution composition, flow rate, and the applied voltage. As these factors change so too does the emitter potential, making it difficult to control various electrochemical reactions in the system. Another factor that can affect the ES process is low analyte electrolytic efficiency resulting from the use of traditional emitter electrode designs. In many instances a low emitter analyte electrolytic efficiency will result in sub optimal signal intensities and/or a distribution of products.

SUMMARY

Disclosed are systems and methods that include a flow-cell that includes porous conductive material(s) that provides a working electrode(s), an inlet connected to the flow-cell to deliver a solution containing an analyte(s) to the flow-cell, an outlet connected to the flow-cell to allow the solution to exit the flow-cell, a counter electrode positioned proximate to the outlet, and a voltage source(s) coupled to the working electrode(s) and the counter electrode.

In some embodiments the voltage source(s) may cause electrolysis of the solution in the flow-cell. In other embodiments, the voltage source(s) may produce an electric field between the outlet and the counter electrode. The electric field so produced may promote electrostatic spraying of the solution towards the counter electrode. In one embodiment the voltage source(s) includes a first voltage source coupled to the working electrode(s), and a distinct second voltage source coupled to the counter electrode.

The counter electrode can be separated from the outlet of the flow-cell by a gap. In some embodiments, the counter electrode comprises an entrance to a mass spectrometer which may identify at least some of the components in the sprayed solution. In some embodiments, the counter electrode may be, for example, be part of the emitter, and/or in some embodiments the spray may be away from the counter electrode and/or into space.

For some embodiments, the porous conductive material(s) can include porous graphite, porous carbon, porous glassy carbon, porous conductive diamond, and/or porous noble metal electrode. The outlet can be electrically non-conductive or conductive, and/or in electrical communication with the working electrode(s).

Characteristics of the working electrode(s) may affect the electrolysis of the solution. Such characteristics may include material, shape, size, and/or location within the flow-cell. In some embodiments, electrolysis effects on the solution may include surface adsorption, selectivity, and/or efficiency.

Embodiments of the disclosed systems and methods may also include a device(s) for measuring the current at the working electrode(s).

The disclosed systems and methods also include a flow-cell that includes a reference electrode and porous conductive material(s) that provides a working electrode(s), an inlet connected to the flow-cell to deliver a solution containing an analyte(s) to the flow-cell, an outlet connected to the flow-cell to allow the solution to exit the flow-cell, a counter electrode positioned proximate to the outlet, and a first voltage source(s) coupled to the working electrode(s).

The first voltage source(s) may include a battery, a voltage divider, a galvanostat, and/or a potentiostatic device. The first voltage source(s) may cause electrolysis of the solution in the flow-cell.

Some embodiments may include a second voltage source electrically coupled to the outlet, and/or the counter electrode. The second voltage source may produce an electric field between the outlet and the counter electrode. The electric field so produced may promote electrostatic spray of the solution towards the counter electrode.

In some embodiments, the working electrode(s) and the reference electrode(s) may be electrically coupled to the first voltage source(s), the outlet may be electrically coupled to the second voltage source, and the working electrode(s) may be electrically decoupled from the outlet. The flow-cell may also include an auxiliary electrode(s) that may be coupled to the first voltage source(s).

Also disclosed is a method in accordance with the disclosed systems, where the method includes delivering a solution containing an analyte(s) through an inlet to a flow-cell that includes porous conductive material(s) that provides a working electrode(s), connecting the flow-cell to an outlet for allowing the solution to exit the flow-cell, placing a counter-electrode proximate the outlet, and supplying a voltage from a voltage source(s) to the working electrode(s) and/or the counter-electrode.

Also disclosed is a method that includes delivering a solution containing an analyte(s) through an inlet to a flow-cell that includes a reference electrode and porous conductive material(s) that provides a working electrode(s), connecting the flow-cell to an outlet for allowing the solution to exit the flow-cell, placing a counter-electrode proximate the outlet, and supplying voltage from a first voltage source(s) to the working electrode(s).

DESCRIPTION

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore features, components, modules, and/or aspects of the illustrations or processes can be otherwise combined, separated, interchanged, and/or rearranged without departing from the disclosed systems or methods.

Figure 1:
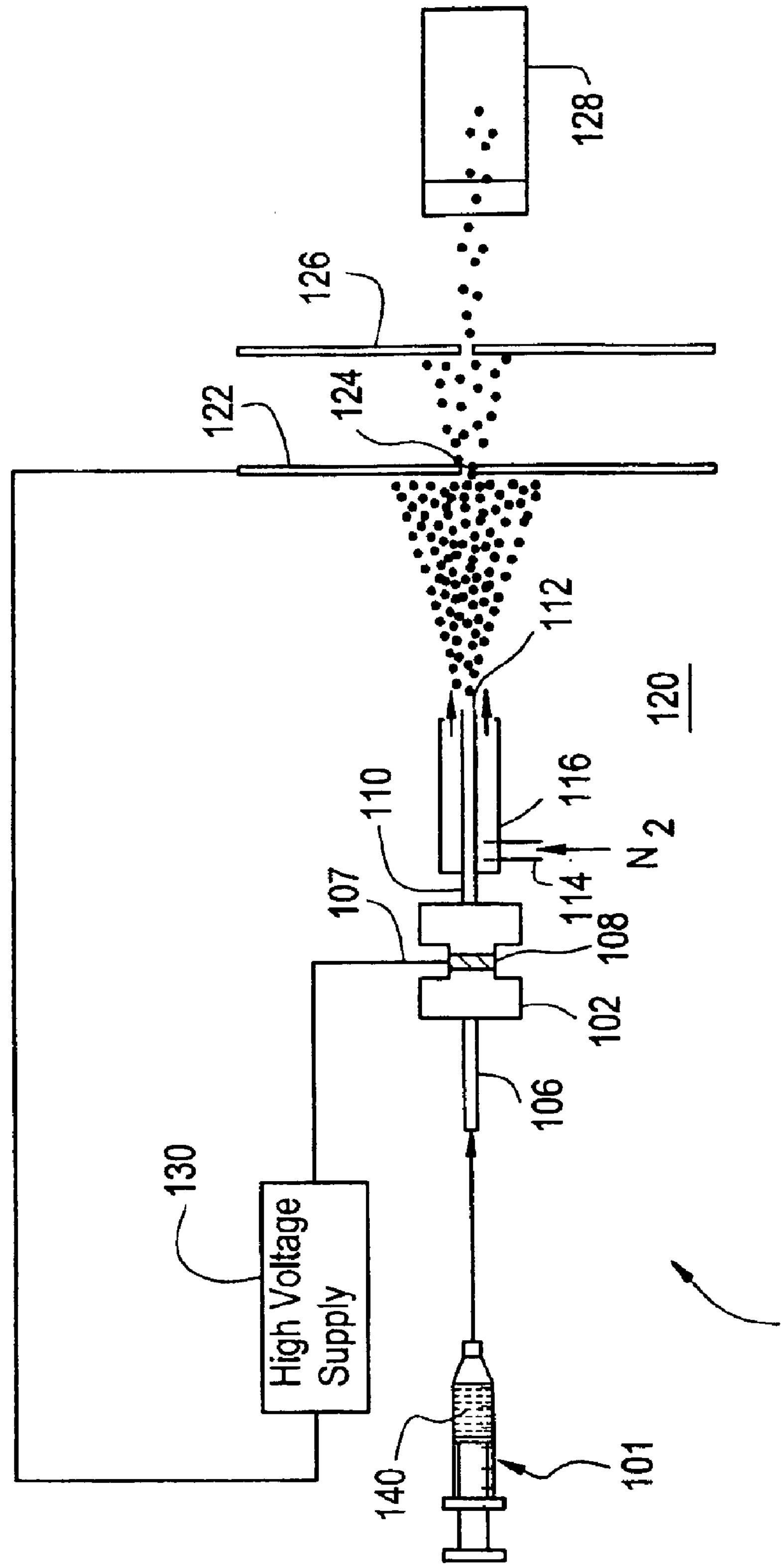
FIG. 1 is one embodiment of an electrospray system using a porous electrochemical flow-cell.

FIG. 1 shows an exemplary embodiment of an electrospray system 100 using a porous electrochemical flow-cell 102. An analyte solution 140 containing at least one analyte and/or at least one solvent, is introduced into an inlet 106 of the system 100. The solution 140 may be injected into the inlet 106 using a solution pump 101. Alternatively, the solution 140 may be delivered from other types of processing apparatus for performing various chemical or physical processes on the solution 140, including, for example, High Performance Liquid Chromatography (HPLC).

The analyte solution 140 received by the inlet 106 flows through a channel formed therein and is received by a porous cell 102. As will be described in greater detail below, the solution 140 enters the porous cell 102 and passes through and/or interacts with the porous conductive material 204 (shown in FIGS. 2 and 3) which provides at least one working electrode 108. As provided herein, the conductive material 204 may substantially span the cross-sectional area of the flow-through channel of the porous flow-cell 102, thereby allowing substantially all of the solution 140 to interact with the porous conductive material of the porous cell 102. As can also be seen from FIG. 1, the working electrode 108 may be electrically coupled to the voltage source 130. The voltage source 130 imparts an interfacial potential to the working electrode. The voltage that is dropped between the porous cell 102 and the counter electrode 122 across the high resistance of the air gap 120 separating the outlet 110 (through which the analyte solution exits the porous cell 102) and the counter electrode 122, creates an electric field for electrospray operation to be established between the outlet 110 and the counter electrode 122. For example, in one embodiment, the voltage of the porous cell 102 is held at 4000V and that of the counter electrode 122 is held at 1000V; the resulting 3000V voltage drop is sufficient to promote electrostatic spray of certain analytes.

The interfacial potential at the working electrode 108 is applied to the analyte solution 140 which consequently causes at least some of the analytes, including such analytes that may ordinarily not be ionized through the electrospray process (e.g., neutral and non-polar compounds), to undergo electrolysis reactions, thereby changing the mass or charge or both of the analyte and creating a species that may now be carried away from the emitter by the electrospray process. Since different analytes can undergo electrolysis (e.g., electrochemically oxidized or reduced) at different interfacial voltages, the particular interfacial voltage at the working electrode 108 thus determines whether a given analyte in the solution 140 may undergo an electrolysis process and become ionized. The analytes that are ionized through the electrolysis process performed by the application of the working potential on the solution 140 are delivered to the outlet 110, and are directed to the opening 112 of the outlet. As will be described in greater detail below, when the solution reaches the opening 112, the electric field present between the opening 112 and the counter electrode 122 causes at least some of the analytes to be sprayed as charged droplets into the air gap 120 between the opening 112 and the counter electrode 122. The sprayed analytes include analytes that have become ionized due to the typical electrospray process (e.g., ionization of compounds, particularly compounds that can readily be ionized by solution or gas phase acid/base reactions), and at least some analytes which ordinarily are not amenable to becoming ionized through the electrospray process, but which have become ionized through the electrolysis process that was performed at the working electrode 108 of the porous flow-cell 102. As the sprayed droplets migrate towards the counter electrode 122, some of the solution's solvent evaporates, and the droplets undergo a Coulombic fission process that results in smaller droplets. This process continues until the fissioned droplets reach the counter electrode desolvated gas phase ions.

The counter electrode 122 may be a metallic plate of various shapes, such as rectangular, circular, etc., and may be connected to a voltage source(s), or electrically grounded, to facilitate a voltage level at the counter electrode 122 to establish an electrical field between the opening 112 and the counter electrode 122 to facilitate the electrospray process. As can be seen from FIG. 1, the illustrated counter electrode 122 has an aperture 124 through which some of the electrospray droplets that reach the counter electrode 122 can pass. As can be appreciated from FIG. 1, only a portion of the charged plume of the analyte solution 140 that was electrosprayed into the air gap 120 passes through the aperture 124.

As described herein, in some embodiments, an emitter sprayer 302 (shown in FIG. 3), such as a fused silica capillary with a tapered tip, may be attached to the outlet 110 to facilitate the electrospraying process. Further, as shown in FIG. 1, optionally connected to the outlet 110, and/or to the optional emitter spray 302, is a nebulizer gas source 114 that introduces inert gas into the sprayed droplets of the solution 140, thereby facilitating electrospraying. As is understood, pneumatic nebulizers inject a high speed gas flow to mechanically disrupt the liquid surface of the solution to be electrosprayed, and thus to form small droplets which are subsequently dispersed by the gas to avoid droplet coagulation, thereby facilitating electrospraying of, for example, solutions having high flow rates. A nebulizer gas source 114 may direct an inert gas, such as, for example, nitrogen ($N_2$), into a tube 116 that may be placed adjacent and parallel to the longitudinal axis of the outlet 112 and/or the emitter spray 302, but which may otherwise be isolated from the outlet 110 and/or the emitter spray 302 so that inert gas delivered by the nebulizer 114 does not enter into the solution flow path defined by the outlet 110 and/or the emitter spray 302. Alternatively, the tube 116 may concentrically encase the outlet 110 and/or the emitter 116 so that the outlet 110 and/or the emitter 112 may be positioned inside the tube 116 substantially along the longitudinal axis of the tube 116. As will be appreciated, a concentric arrangement of the outlet 110 and/or the emitter spray 112 inside the tube 114 enables a substantially uniform application of the pneumatic gas ejected from the opening of the tube 114 onto the sprayed mixture of the analyte solution exiting the opening 112 and/or the emitter spray 302, thereby enhancing dispersion of the droplets into the air gap 120, and thus improving the electrospray process. It will be appreciated that other configurations for the tube 116 delivering the pneumatic gas, and/or other configurations and arrangements for positioning the outlet 110 and/or emitter spray 302 relative to tube 116 are possible.

Analysis and detection of the sample charged droplets that emerge from the aperture 124 in counter electrode 122 can be performed by a mass spectrometer 128, which may comprise an orifice plate 126, a skimmer electrode (not shown), and the mass spectrometer analysis and detection unit 128. It will be appreciated that the electrosprayed analyte droplets that reach counter electrode 122 may be presented to other types of apparatus and equipment, and that reference to a mass spectrometry apparatus is for illustration and not limitation. It will also be appreciated that the proximity of the electrochemical flow-cell 102 in the exemplary apparatus 100 of FIG. 1 to the spray source allows short-lived ionized analytes that underwent electrochemical reactions in flow-cell 102 to be detected by detection and analysis apparatus coupled to the electrospray apparatus.

Figure 2:
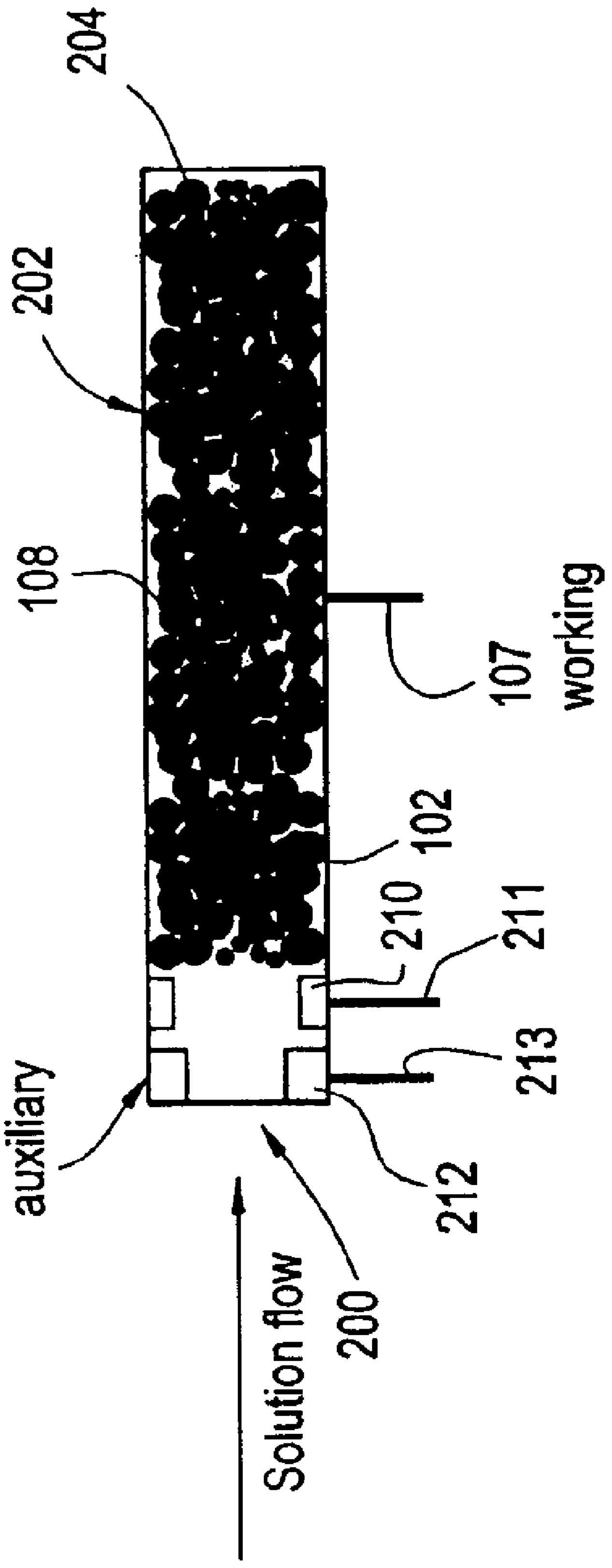
FIG. 2 is a side view, in cross-section, of one embodiment of a porous electrochemical flow-cell of FIG. 1.
Figure 3:
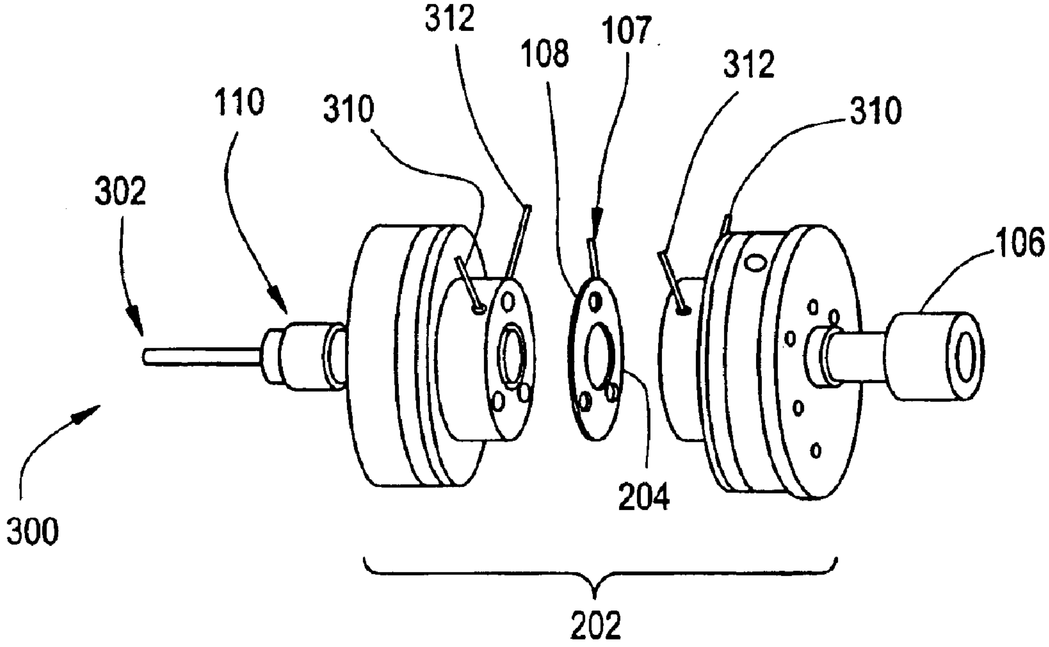
FIG. 3 is an exploded view of one embodiment of a porous electrochemical flow-cell.

FIG. 2 provides a cross-sectional side view of an exemplary embodiment of a porous electrochemical cell that may be used with a system 100 according to FIG. 1, while FIG. 3 shows an enlarged front view of an exemplary embodiment of porous electrochemical cells (which may be the same as or different from those porous flow-cells shown in FIGS. 1 and/or 2), such as those manufactured by ESA, Inc. For consistency, parts and components of porous flow-cell 200 and 300 in FIGS. 2 and 3 respectively, which are the same or similar to parts and components of flow-cell 102 shown in FIG. 1, have been marked with the same reference numerals used in relation to those parts/components of the porous flow-cell 102. An additional example of a porous electrochemical cell is disclosed in U.S. Pat. No. 4,552,013 entitled "Electrochemical System", the contents of which are hereby incorporated by reference in their entirety.

As shown in FIGS. 1 and 2, one embodiment of a porous electrochemical cell 102 comprises an elongate tubular body 202, made of suitable materials, such as, for example, polyether ether ketone (PEEK), and is packed with a porous conductive material 204 such as metal particles, porous graphite or carbon, porous glassy carbon, porous conductive diamond particles, and/or other types of conductive materials. Other crosssections of the body 202 may be used without departing from the scope of the disclosed methods and systems. As provided herein, conductive material(s) 204 provides the working electrode for porous cell 102. The illustrated body 202 defines a flow channel through which the sample solution 140 passes. With reference to FIG. 3, working electrode 108 comprises a porous conductive material 204 held in place by the electrical contact 107, which in the exemplary embodiment of FIG. 3, is shaped as a circular plate having a circular opening about the center of the electrical contact 107, and into which the porous conductive material 204 is fitted. The conductive material 204 may have a surface that substantially matches the cross-sectional area of the flow-through channel defined by the body 202, thereby ensuring that substantially most of analyte solution contacts and/or interacts with the porous conductive material 204. Similarly, in the exemplary embodiment of the porous flow-cell of FIG. 3, the diameter of the circular opening of the electrical contact 107, into which the porous conductive material 204 may be fitted, can be substantially the same as the diameter of the channel defined by the illustrated body 202 through which the analyte solution passes. It will be appreciated that other shapes, configurations, and dimensions of electrical contact 107 are possible. It will also be appreciated that the porous conductive material 204 may be held in place using other devices or components, and that various conductive material 204 may assume a wide range of shapes, configurations, and dimensions, and may be electrically coupled to the electrical contact 107 at one or more discrete locations. Further, more than one working electrode may be formed or provided by the conductive material 204, and more than one conductive material 204 may be used to form such working electrodes. Moreover, in addition to the conductive materials 204, the working electrode 108 may also be constructed of various dielectric materials. Additionally, the plurality of working electrodes that may be formed from the conductive material 204 may be positioned in many possible arrangements within the porous flow-cell 102. For example, a plurality of working electrodes may be placed in a cascade arrangement within the porous flow-cell 102, such that the working electrode(s) are adjacent to each other, thereby increasing the amount of porous conductive material that interacts with the analyte solution, and thus facilitating the electrochemical processes performed by the porous cell 102. Such an embodiment can include different interfacial potentials at each working electrode(s).

Also shown in FIG. 2 are a reference electrode 210 and an auxiliary electrode 212, electrically coupled to a voltage source or a voltage controller (not shown in FIG. 2), through electrical contacts 211 and 213 respectively. As will become apparent herein, the reference electrode 210 and the auxiliary electrode 212 can be used to control the potential difference between the reference electrode 210 and the working electrode 108, and thus control the interfacial potential at the working electrode 108; however, use of a reference and auxiliary electrode 210, 212 is optional for operation of porous cell 102. Also, optionally, coupled to the working electrode 108, and/or to the reference electrode 210, and/or the auxiliary electrode 212, is a current measuring device for measuring the current of the working electrode 108.

The inlet 106 through which the analyte solution 140 may enter the porous cell 102, may in some embodiments form part of the porous cell 102, while in other embodiments inlet 106 may be a separate component or fitting that may be attached to the porous cell 102. For example, as can be seen in the FIG. 3, the inlet 106 may comprise a cylindrical tube connected to a threaded shaft that can be received by a corresponding threaded opening and channel formed on the side of the porous cell 102, thereby allowing the inlet 106 to be mounted and secured into the porous flow-cell 102. The inlet 106 may have a channel passing through it, through which the analyte solution 140 can be delivered to the porous cell 102. The inlet 106 may be constructed of conductive or non-conductive materials.

Like the inlet 106, the outlet 110, which receives the analyte solution 140 exiting from the porous flow-cell 102, may also form part of the porous cell 102, or may be a separate component or fitting that can be attached to the porous flow-cell 102. Thus, as can be seen in FIG. 3, outlet 110 comprises a cylindrical tube attached to a threaded shaft which may be mounted onto the flow-cell 102 using corresponding threads defined on the walls of the output of the channel defined by the body 202 of the porous flow-cell 102. The outlet 110 also includes a bore which may extend along the longitudinal axis of the outlet 110, and openings, for example, the output opening 112 through which the analyte solution enters and exits the outlet 110. Both the threaded bore in the outlet 110 and the opening 112, through which the analyte solution exits the outlet 110, may have such shapes and dimensions, including for example, diameter and length, that enable electrospray operation. For example, the shape of the bore of the outlet 110 may be such that the bore's diameter near the opening 112 is tapered to form a cone leading into the opening 112. Providing the bore with a cone-shape near the opening 112 may allow the analyte solution to be ejected, or sprayed, out of the opening 112, thereby facilitating the electrospraying mechanics.

Optionally, a spray emitter 302 (shown in FIG. 3), such as, for example, a fused silica capillary with a taper tip, may be connected to the outlet 110 to direct the solution through a channel having a shape designed to facilitate spraying the droplets in the analyte solution 140 as it exits the porous cell 102 and/or the outlet 110. Such an optional spray emitter may be used if, for example, the shape of the opening 112, and/or the shape of the bore of the outlet 110 are such that they may be ineffective for causing electrospraying.

In operation, an analyte solution 140 may be injected into the inlet 106 by a pump 101 and can thereafter be delivered to a porous cell 102. A voltage generated by a voltage source 130 can be applied to the working electrode 108, via an electrical contact 107. The voltage establishes an electric field between the outlet 110 (or emitter spray 302) and the counter electrode 122 thereby creating an electrospray current. The voltage also establishes a potential at the working electrode 108 of the porous cell 102. The potential value depends on factors such as the composition of the emitter electrode and the composition of the solution. Depending on the potential of the working electrode 108, the analyte solution 140 may undergo electrochemical reactions (e.g., electrolysis reactions) corresponding to that potential. For example, analytes that may become oxidized at the potential set by the voltage level at the working electrode 108 may accordingly become oxidized. The analyte solution 140 processed by the porous flow-cell 102 is delivered to the outlet 110 and/or the emitter spray 302. The electrical field formed between opening 112 of outlet 110 (or the tip of emitter spray 302) causes at least some of the analytes in solution 140 not ionized by the electrochemical reactions in the porous cell 102 to become ionized, and further causes the solution to be sprayed. As provided herein, some of the charged analytes sprayed into the air gap 120, including some of the analytes that became ionized through the electrochemical reactions in the porous cell 102, reach the aperture 124 of the counter electrode 122, whereupon those analytes can be processed by a mass spectrometer 128, and/or another type of apparatus and/or equipment.

As provided herein, the voltage applied to an exemplary apparatus 100 is distributed over several loads present between the working electrode 108 and the counter electrode 122. These loads include the electrical resistance of the analyte solution 140 and the air gap 120 between the opening 112 (or the tip of the emitter spray, if one is used) and the counter electrode 122. The electrospray current $I_{ES}$, which can be defined as the electrosprayed droplet generation rate times the average charge per droplet, is a complex function that depends on several factors, including the solution's composition and viscosity, and thus the value of $I_{ES}$ tends to fluctuate. This fluctuation in the value of $I_{ES}$ results in corresponding fluctuations in the voltage distribution in the electrical circuit formed between the voltage source 130 and the counter electrode 122, causing the value of the interfacial potential measured at the working electrode 108 to also fluctuate. Accordingly, in the absence of control over the interfacial potential at the working electrode 108, it can be difficult to control and/or determine which reactions (e.g., electrolysis reactions) are occurring at a given time at the working electrode 108, and therefore it can be difficult to control and/or determine which analytes will subsequently undergo electrospray processing, and/or for further processing and analysis by apparatus and equipment (e.g., mass spectrometer) interfacing with the electrospray apparatus.

Figure 4:
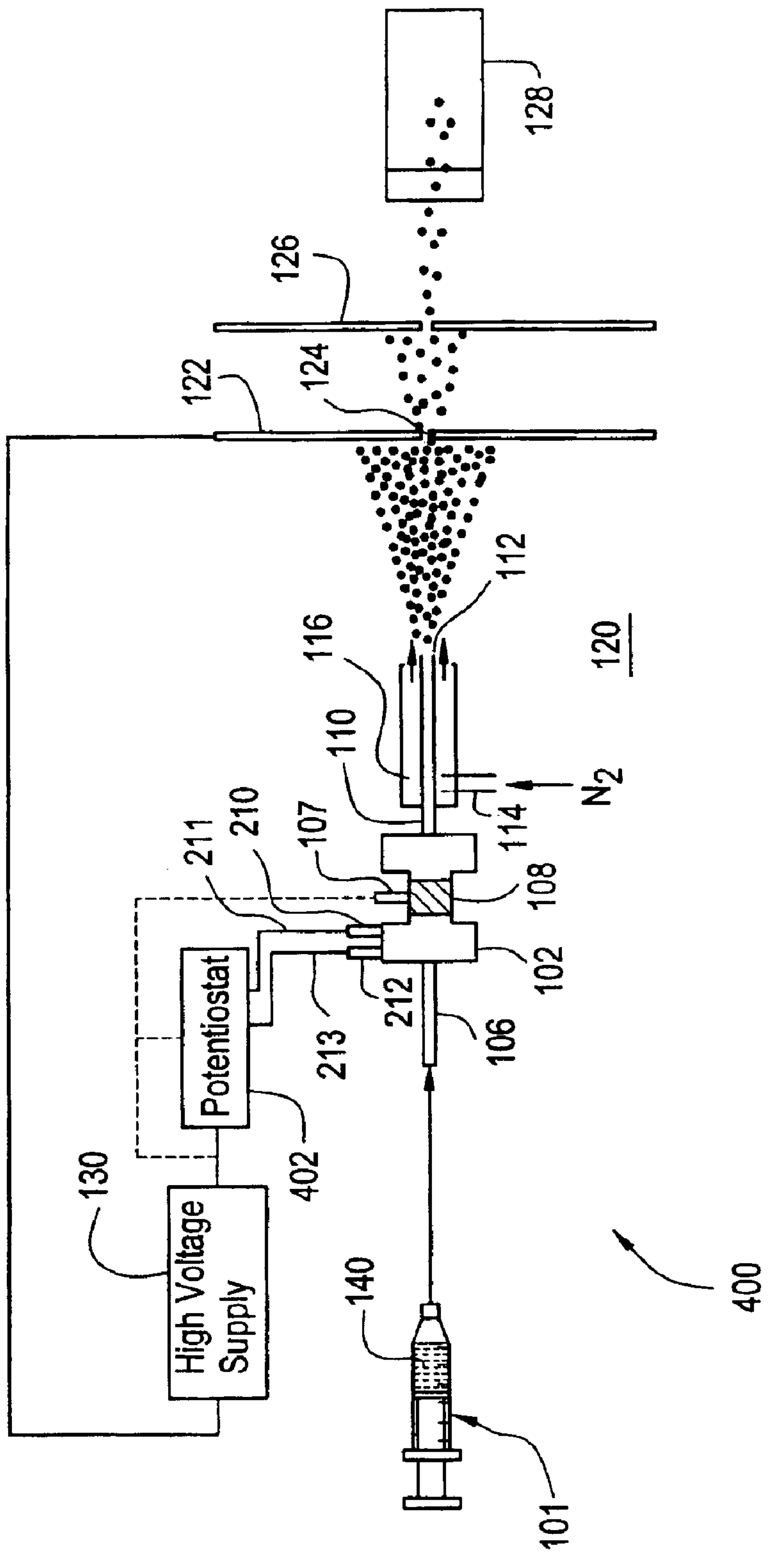
FIG. 4 is a second embodiment of an electrospray system using a porous electrochemical flow-cell.

FIG. 4 shows an embodiment of an electrospray emitter using a porous electrochemical flow-cell 102, in which the interfacial potential at the working electrode may be controlled, therefore enabling the nature of the electrochemical reaction taking place at the working electrode 108 to be controlled. Parts and components shown in the exemplary embodiment of FIG. 4 that are the same or similar to parts and components shown in FIGS. 1, 2, and 3, have been marked with the same reference numerals used in relation to those parts/components of FIGS. 1, 2, and 3. As can be seen, in addition to a working electrode 108, which in the embodiment of FIG. 4 is electrically coupled via the electric contact 107 to a potentiostat referenced to a voltage source 130, the illustrated porous flow-cell 102 also includes a reference electrode 210 and an auxiliary electrode 212 (also shown in FIG. 2) which are electrically coupled to a potentiostat 402. As indicated by the broken lines extending from the contact 107, working electrode may alternatively be coupled to the potentiostat 402.

As is understood, one feature of a reference electrode 210 is to provide a reference voltage/point for controlling the potential at a working electrode 108. Similarly, an auxiliary electrode 212 may be used to facilitate control of the potential drop at the working electrode 108 independent of the voltage drop between the porous flow-cell 102 and the counter electrode 122. Both the reference electrode 210 and the auxiliary electrode 212 may be constructed of suitable conductive materials, such as, for example, Palladium (Pd), Platinum, and/or an alloy comprising one or more of these materials, and/or another suitable material. While electrodes 210 and 212 are shown in FIG. 4 (and also in the exemplary illustration of the porous cell 200 of FIG. 2) to be located in an upstream arrangement relative to working electrode 108 (e.g., where both electrodes are located between the inlet 106 and the working electrode 108), it will be appreciated that the reference electrode 210 and the auxiliary electrode 212 may be positioned in different locations in the porous cell 102. For example, in some embodiments the reference electrode 210 and the auxiliary electrode 212 may be located on either side of the working electrode 108. Further, both the reference electrode 210 and the auxiliary electrode 212 may be oriented in a variety of ways relative to the working electrode 108, including for example, parallel configuration, slanted configuration, etc. Additionally, the reference electrode 210 and/or the auxiliary electrode 212 may be constructed as a plurality of electrical wires made of suitable conductive materials, or comprise ring electrodes. For example, as can be seen in FIG. 3, the reference electrode 310 and the auxiliary electrode 312 can be wire-pair electrodes positioned on both sides of working electrode 108.

One consideration when determining, for example, the dimensions, and/or location and orientation of the auxiliary electrode 212 in the porous flow-cell 102 is the need to control so-called "back reactions" that result in unwanted electrolysis of analytes. In controlling the working electrode potential of an electrochemical cell, a commensurate change of the potential at the auxiliary electrode may occur. For example, decreasing the working electrode potential to prevent oxidation of a particular analyte may cause the potential at auxiliary electrode to increase, and consequently the electrochemical reaction(s) avoided at the working electrode may nevertheless occur at the auxiliary electrode 212. The extent of such back reactions can be particularly significant if the surface area of the auxiliary electrode is large enough that a sizable portion of the solution may come in contact with the surface of the auxiliary electrode and thus cause that portion of the solution to undergo electrochemical reactions. For example, in a thin-layer electrochemical cell which may be have large surface area auxiliary electrodes, the extent of the back reactions can be significant, and can introduce unwanted electrolyzed analytes for analysis by, for example, a mass spectrometer. Accordingly, the auxiliary electrode 212, and/or the reference electrode 210, can have a small surface area to subsequently reduce back reactions and/or be removed from direct contact with the flowing solution 140.

As can further be seen in FIG. 4, potentiostat 402 can provide voltage control at the electrode(s) to which the potentiostat 402 is coupled. As is understood, a potentiostat 402 can be used to produce a voltage output at the auxiliary electrode, which is presented to the working electrode 108. The resulting interfacial potential of the working electrode 108 is compared to the reference electrode 210 and fed back to the auxiliary electrode 212 for compensation so that a working electrode 108 potential set point can be maintained. The entire system is referenced to an external voltage, typically earth ground; however, as shown in FIG. 4 an external voltage source (e.g., voltage source 130) can also be used. For example, the potential at the working electrode 108 (e.g., the interfacial potential) may be remotely set and is realized by the difference in potential between the working electrode 108 and the reference electrode 210, while the system voltage is that of the external voltage source 130. As will be appreciated, other schemes for setting the voltage level at the point to be controlled may be used. A user-controlled dial, knob, and/or other components/devices can be used to adjust the setting of the potentiostat to enable control of the voltage level of the porous flow-cell 102 (e.g., the working electrode). A potentiostat device 402 and/or other types of voltage controllers for controlling the voltage in the porous flow-cell 102 may be implemented using an operational amplifier or using processor-based devices comprising memory elements (volatile and non-volatile), peripheral devices to enable external communication and control between such a processor-based device and the porous cell 102, and/or other control circuitry for determining, regulating, and/or controlling the voltage level in the porous flow-cell 102. Other apparatus and/or devices, including, for example batteries, voltage dividers, and galvanostats, may be used to control the voltage at the working electrode 108.

Shown in FIG. 4, a voltage source 130 can be electrically coupled to the working electrode 108 and to the potentiostat 402. A potentiostat 402 can be electrically coupled to the reference electrode 210 and to the auxiliary electrode 212, through the electrical contacts 211 and 213 respectively, and enable control of the potential difference between the working electrode 108 and the reference electrode 210, thus providing control over the interfacial potential at the working electrode 108. The working electrode 108 may be electrically coupled to the polentiostat device 402, and need not be directly coupled to the voltage source 130. While the voltage source 130 is shown to be electrically connected to the counter electrode 122, thereby defining an electrical circuit that includes the voltage source 130, the potentiostat 402, the porous flow-cell 102, the air gap 120 and the counter electrode 122, the counter electrode 122 may be electrically coupled to more than one voltage source, and need not be electrically coupled to the voltage source 130.

As with the electrospray apparatus 100 shown in FIG. 1, the outlet 110 of the porous electrochemical cell 102 may eject the ionized solution 140 into the air gap 120 through the electrospray process described herein. A nebulizing gas source 114 may also be used to facilitate the electrospray process. Charged analytes reaching the aperture 124 of the counter electrode 122 can subsequently be processed by a mass spectrometer 128 and its associated apparatus, and/or other types of apparatus and equipment.

In operation, an analyte solution 140 may be injected into the inlet 106 by a pump 101 as described herein in reference to the electrospray apparatus 100. The injected analyte solution 140 can thereafter be delivered to a porous cell 102. A voltage, for example, IV can be applied to the auxiliary electrode 212 by the potentiostat 402 causing a specific potential to be realized at the working electrode 108 referenced to the reference electrode 210. The potentiostat 402 is referenced to the external voltage supply 130 at, for example, 4000V. Using control devices such as, for example, dials and knobs, the voltage level between the reference electrode 210 and the working electrode 108 can be adjusted and set. Depending on the potential set between the working electrode 108 and the reference electrode 210, the analyte solution 140 may undergo electrochemical reactions (e.g., electrolysis reactions) corresponding to that potential. For example, analytes that may become oxidized at the potential now set at the working electrode 108 may accordingly become oxidized. As can be appreciated, the voltage supplied by the voltage source 130 is used to generate an electrical field between the porous flow cell 102 and the counter electrode 122 for providing the electrospray. The analyte solution 140 processed by the porous flow-cell 102 is delivered to the outlet 110 and/or the emitter spray 302. An electrical field formed between the opening 112 of the outlet 110 (or the tip of emitter spray 302) may cause at least some of the analytes in the solution 140 not ionized by the electrochemical reactions in the porous cell 102 to become ionized, and further cause the solution to be sprayed. As provided herein, some of the charged analytes sprayed into the air gap 120, including some of the analytes that became ionized through the electrochemical reactions in the porous cell 102, reach the aperture 124 of the counter electrode 122, whereupon those analytes are processed by a mass spectrometer 128, or other types of apparatus and equipment.

Figure 5:
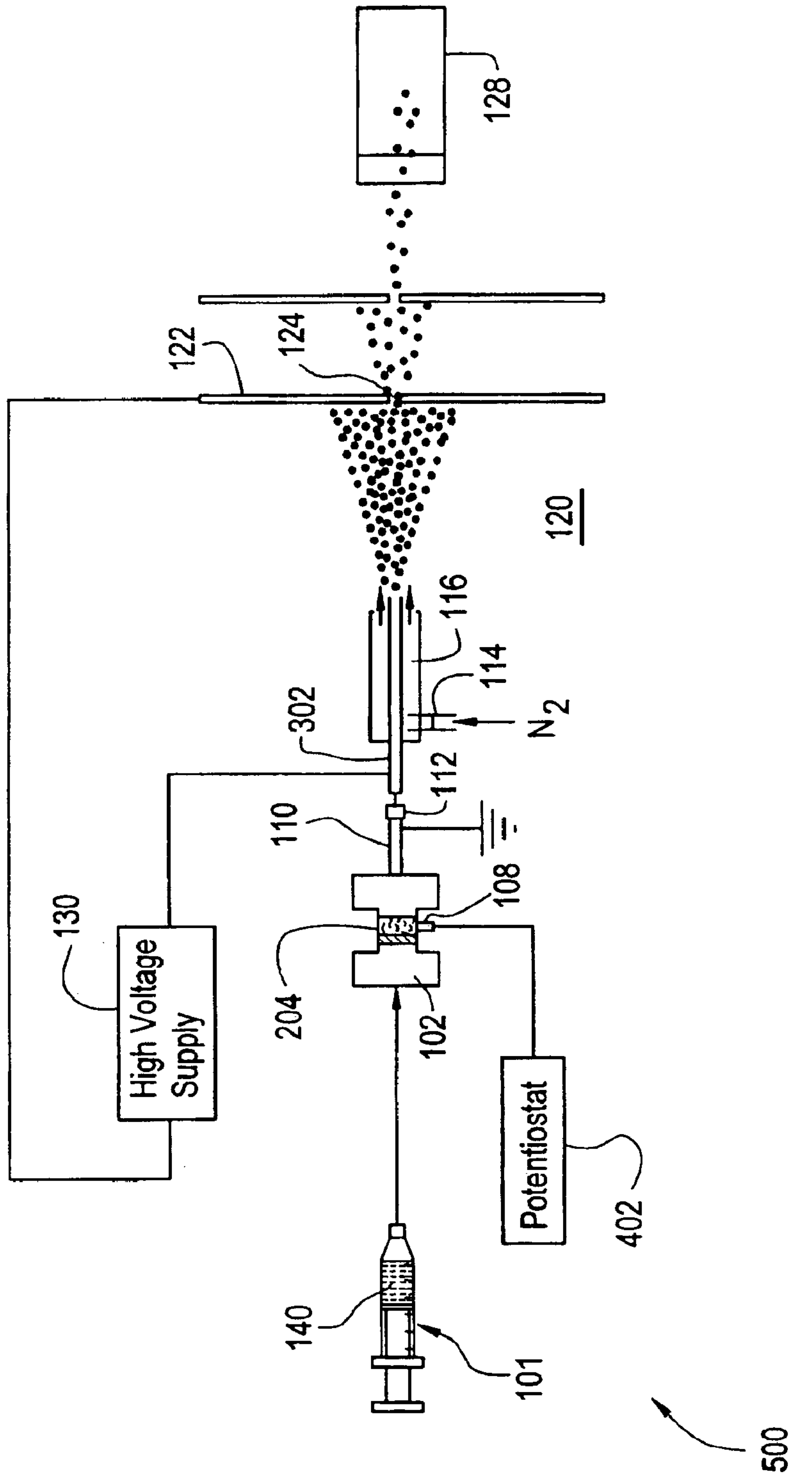
FIG. 5 is a third embodiment of an electrospray system using a porous electrochemical flow-cell.

FIG. 5 shows an embodiment an electrospray apparatus 500. Unlike the FIG. 4 electrospray apparatus 400 where the porous cell was electrically coupled to the outlet and/or an emitter spray device, in the FIG. 5 arrangement 500, the porous cell 102 is electrically decoupled from the emitter spray 302 used to eject the processed analyte solution into the air gap 120. It will be appreciated that electrical decoupling can also be established between various points in the electrospray apparatus 500, including for example, electrical decoupling between the working electrode 108 and the outlet 110. The FIG. 5 arrangement can provide control to the working electrode potential that is not effected by the fluctuating voltage level at the emitter spray 302 (which, as provided herein, is effected by a number of factors, including, for example, the composition and viscosity of the analyte solution being sprayed). Further, by electrically decoupling the porous cell 102 from the emitter spray 302 and/or other part of the electrospray apparatus 500, the voltage levels provided by a potentiostat 402 and/or other voltage sources coupled to the working electrode 108 can be referenced to earth ground (since such voltage sources do not have to be used to establish the large electric field across the air gap 120) and thus a user is not exposed to electric shock hazards that the user may otherwise be exposed to if the porous cell 102 was not electrically decoupled from the emitter spray 302.

In operation, an analyte solution 140 can be injected into the inlet 106 which delivers the solution to a porous cell 102. A potentiostat device 402, which may be one of a voltage source generating a voltage level to operate the porous cell 102 (e.g., a range substantially between approximately ±100V), a voltage divider, control circuitry comprising of non-linear devices (e.g., transistor and operational amplifiers, and/or other types of voltage controllers), and/or a potentiostat, is coupled to the working electrode 108, and/or optionally to a reference electrode and/or an auxiliary electrode (not shown in FIG. 5). It will be appreciated, however, that more than one potentiostat, and/or other voltage sources may be coupled to the porous cell 102. The voltage output by the potentiostat 402 can be adjusted to a level to establish a potential at the working electrode 108. That established potential at the working electrode 108 can thereafter determine the type and nature of the electrochemical reactions that may occur in the porous cell 102.

Thus, the established potential at the working electrode 108 can cause at least some of the analytes in the solution 140 to undergo electrochemical reactions (e.g., electrolysis) which can result in some of the analytes becoming oxidized, and/or otherwise ionized. The processed analyte solution 140 can exit the porous cell 102 through the outlet 110. The outlet 110 is electrically grounded, thereby electrically isolating, or decoupling, the porous cell 102 from the apparatus that is mechanically connected to the emitter 302.

A high voltage source 130, generating, for example, a voltage of 4000V, can be coupled to the emitter sprayer 302 and thereby cause an electric field to form between the tip of the emitter spray 302 and the counter electrode 122. As will be appreciated, additional voltage sources may be electrically coupled to the emitter spray 302. The input of the emitter spray 302 can be mechanically coupled to the outlet 110 through the opening 112, and the received solution 140 which was electrochemically processed by the porous flow-cell 102. The received solution 140 is directed to the output of the emitter spray 302, and due to the electric field formed between the tip of the emitter spray 302 and the counter electrode 122, the analyte solution 140 is electrosprayed. Through the electrospray process, at least some of the charged analytes in the solution 140, including those analytes oxidized and/or otherwise ionized by the porous flow-cell 102, migrate towards the counter electrode 122. A nebulizer gas source 114 may facilitate the electrospray process, as provided herein. A portion of the sprayed analytes passes through the aperture 124 of the counter electrode 122, whereupon that sample is processed and analyzed by, for example, a mass spectrometer 128 and/or other equipment and apparatus.

To investigate the efficacy of using porous cell to facilitate electrospray operations by controlling the nature and extent of electrochemical reactions taking place in the porous flow-cell, the performance of the porous electrochemical cell was tested for a reserpine solution prepared as a mixture of 1:1 water and acetonitrile with 5.0 mM ammonium acetate ($NH_4OAc$) and 0.75% acetic acid. Reserpine is amenable to electrospray ionization, resulting in a protonated species of reserpine (i.e., $(M+H^+)$) having a corresponding mass-to-charge ratio (m/z) of 609. Additionally, reserpine can also be ionized through electrolysis reactions occurring in the electrochemical cell, and can be ionized to one species having a mass-to-charge ratio of 607 and/or to an ionized species having mass-to-charge ration of 625.

The reserpine sample solution used in these experiments was pumped into the porous electrochemical cell using a syringe pump. In performing the electrospray performance tests, the porous cell used was an ESA, Inc. prototype cell having a PEEK body and comprising of a porous carbon working electrode (40% total porosity, 99% open porosity with a mean pore size of 0.8 μm) having a 1.6 mm diameter and 0.38 mm thickness, a set of two Palladium quasi-reference electrodes, and a set of two Palladium auxiliary electrodes. The two sets of electrodes (auxiliary and reference) were placed on either side of the working electrode and tied together. The porous electrochemical cell was coupled to a SCIEX API 365 TurbolonSpray Source, having a 3.5 cm 360 μm OD 50 μm ID tapered tip fused silica capillary emitter, which was further connected to a nebulizing gas source. Voltage levels at the porous electrochemical cell (e.g., at the working electrodes) were controlled by a potentiostat.

Figure 6:
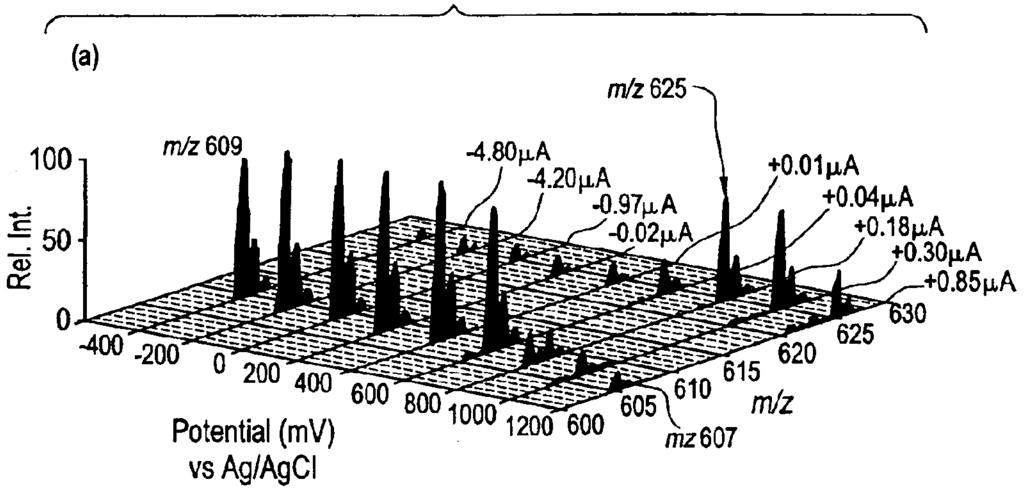
FIGS. 6 shows an electrospray mass spectra at two different flow rates, and different interfacial potentials, for a porous electrochemical flow-cell, when analyzing reserpine by electrospray mass spectrometry.
Figure 6:
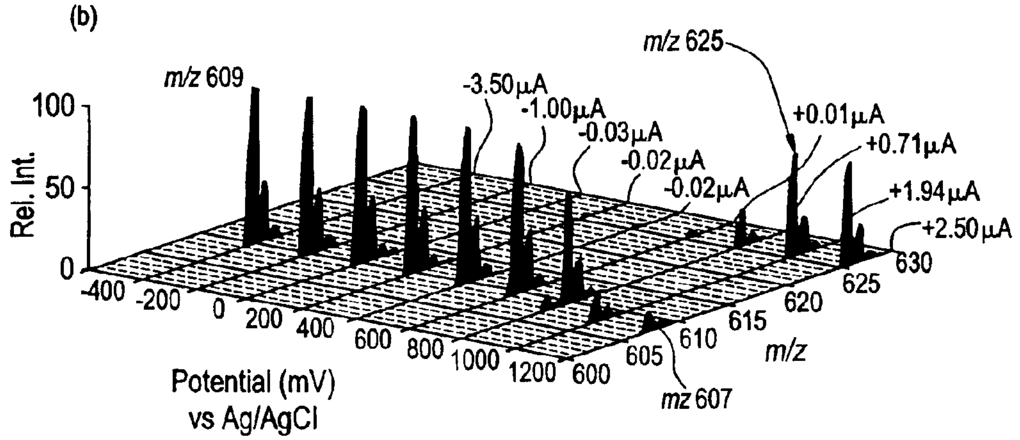

FIG. 6 provides the respective electrospray mass spectra at two different flow rates (2.5 $\mu$L/minute and 30 $\mu$L/minute), and different interfacial potentials, for the porous electrochemical cells. As can be seen in the top mass spectra of FIG. 6 which depicts the mass spectra obtained using a porous flow-cell, at a flow rate of 2.5 $\mu$L/minute, over a range of interfacial potentials, the porous cell exhibited controlled electrolysis behavior, i.e., at low potentials there is little if any oxidation and at larger applied potentials there is close to complete oxidation of reserpine. This is born out by the appearance of only m/z 609 at the lower potentials (this is the protonated parent compound, i.e., $M+H^+$) and of a mixture of the oxidized species m/z 607 and m/z 625 at the higher applied potentials.

Further, as can be seen from the bottom mass spectra in FIG. 6, at a flow rate of 30 $\mu$L/minute, which generally results in reduced electrochemical reactivity at the working electrode compared to the reactivity at lower flow rates due to the shorter exposure time of the flowing solution to the electrodes of the electrochemical cells, oxidation of reserpine (primarily to its 625 m/z species) was also completely controlled, i.e., at low applied potentials no oxidation is observed and at higher applied potentials almost complete oxidation is observed. As provided herein, no oxidation of reserpine occurred in the porous cell at the lower interfacial potentials, and at the high flow rate, due to the relatively small surface area of the auxiliary electrode, which consequently prevented electrolysis back reactions at that electrode from taking place.

Figure 7:
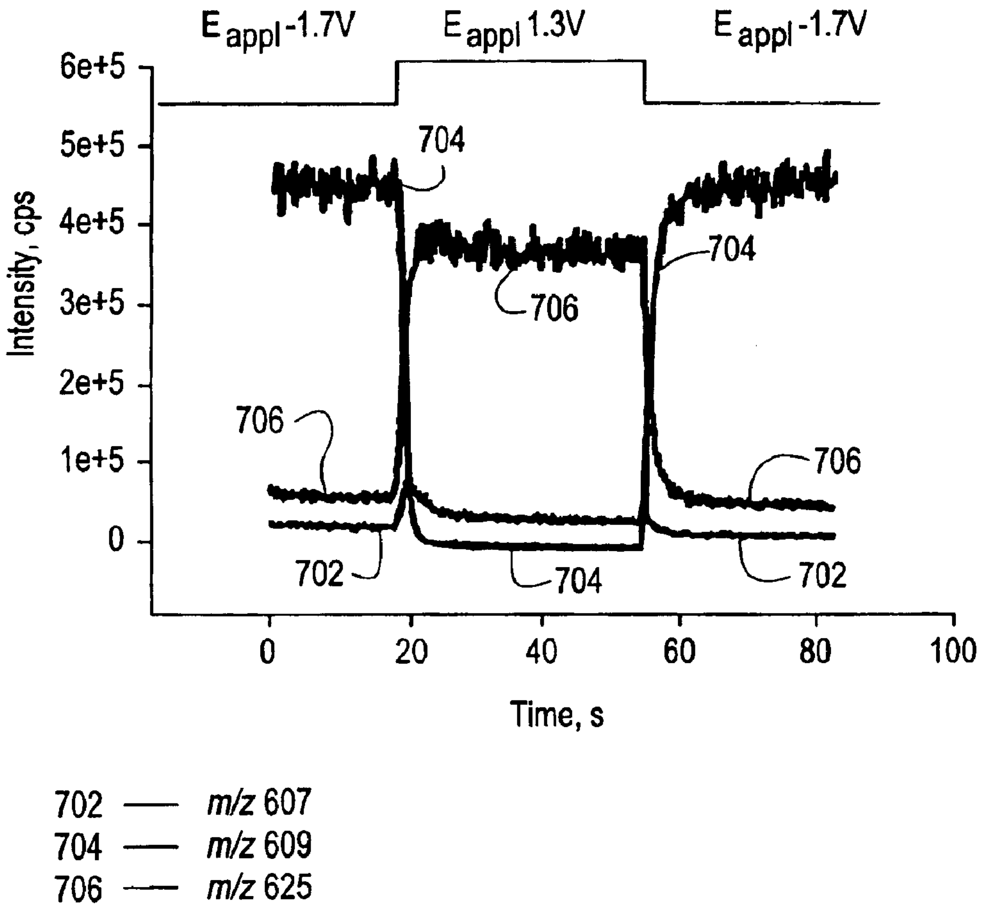
FIG. 7 shows the response time behavior of a porous electrochemical flow-cell, when analyzing reserpine by electrospray mass spectrometry, to a change to the applied interfacial potential.

FIG. 7 shows the response time behavior of a porous cell to a change to the applied interfacial potential, and demonstrates the electrochemical control capabilities of a porous cell. The sample solution used for this experiment was 20 tLM reserpine, prepared as a mixture of 1:1 water and acetonitrile with 5.0 mM ammonium acetate ($NH_4OAc$) and 0.75% acetic acid, pumped through the porous cell at a flow rate of 30 $\mu$L/minute. As can be seen, reserpine became oxidized as the potential of the working electrode was stepped from −1.7V to 1.3V, with most of the reserpine oxidizing to the 625 m/z species (the curve labeled 706), and with a small portion oxidizing to the 607 m/z species (the curve labeled 702). When the potential at the working electrode was reset to −1.7V, very little oxidation (corresponding to the 607 m/z and 625 m/z species) took place. Further, as can be observed from FIG. 7, the oxidation response time between application of the potential step and the corresponding recorded oxidation was less than two (2) seconds. Accordingly, as indicated by FIG. 7, control of the working electrode potential of a porous flow-cell can be used to substantially control the extent of oxidation taking place in the porous cell, and thus facilitate analysis of compounds, and/or ionized species thereof, that otherwise may not be available for mass spectrometry analysis, and/or for other types of analyses requiring ion sources. Further, response times corresponding to application of different working electrode potentials are relatively fast.

Figure 8:
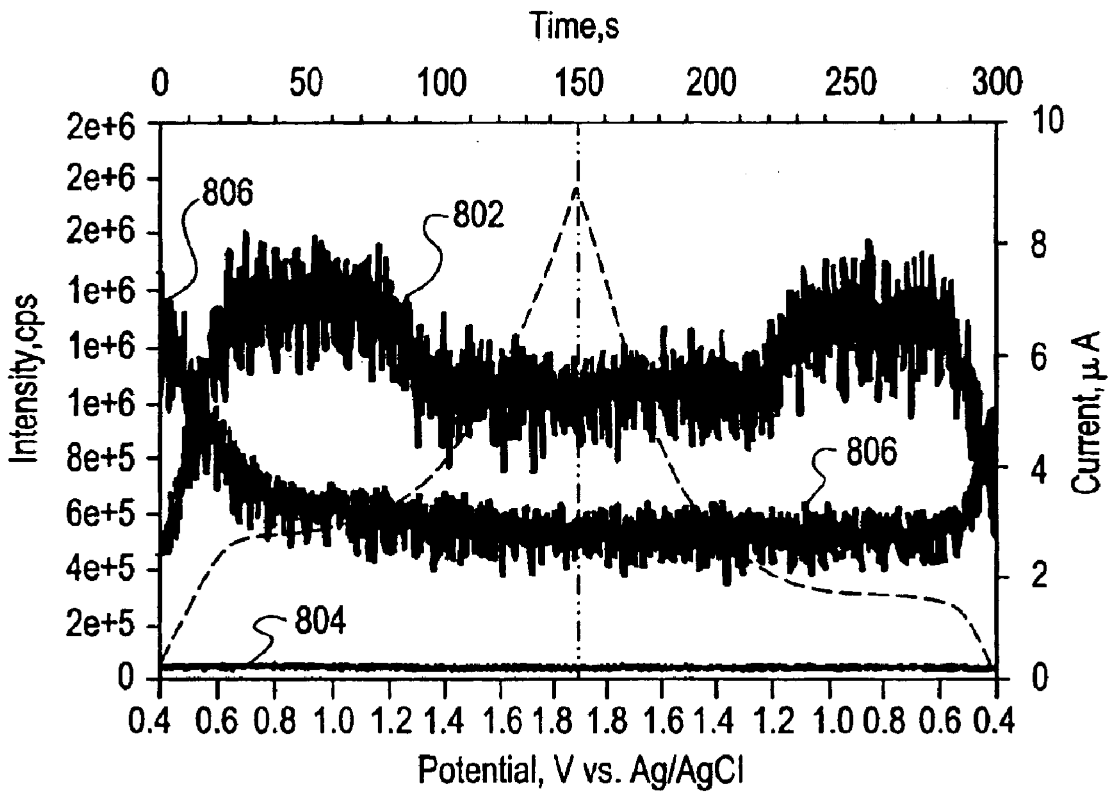
FIG. 8 shows the oxidation product intensity over a range of working electrode potentials for dopamine using a porous electrochemical flow-cell.

FIG. 8 shows oxidation product intensity over a range of working electrode potentials for dopamine, and provides another example of the capability of a porous cell to control oxidation of analytes in a solution (which subsequently may be analyzed and studied, using, for example, mass spectrometry equipment). In conducting the experiment pertaining to FIG. 8, a solution comprising of 20 $\mu$M of dopamine in 5 mM of ammonium acetate ($NH_4OAc$) 50% methanol/water (having a pH level of approximately 7) was pumped through a porous flow-cell, similar to the porous cell(s) used in the experiments pertaining to FIGS. 6–8, which was upstream and decoupled from the electrospray source (i.e., similar to the electrospray apparatus arrangement shown in the exemplary embodiment of FIG. 5). As can be seen, as the working electrode potential was scanned in the positive direction, a decrease in the intensity level of dopamine, having a mass-to-charge ratio of 154 (the curve labeled 806), occurred concomitantly with an increase in the intensity level of dopamine having a mass-to-charge ratio of 150 (the curve labeled 802, corresponding to a species of dopamine that results from the loss of four (4) electron and four (4) protons of the dopamine having a mass-to-charge ration of 154), indicating that dopamine was being oxidized at the working electrode potential range shown.

Figure 9:
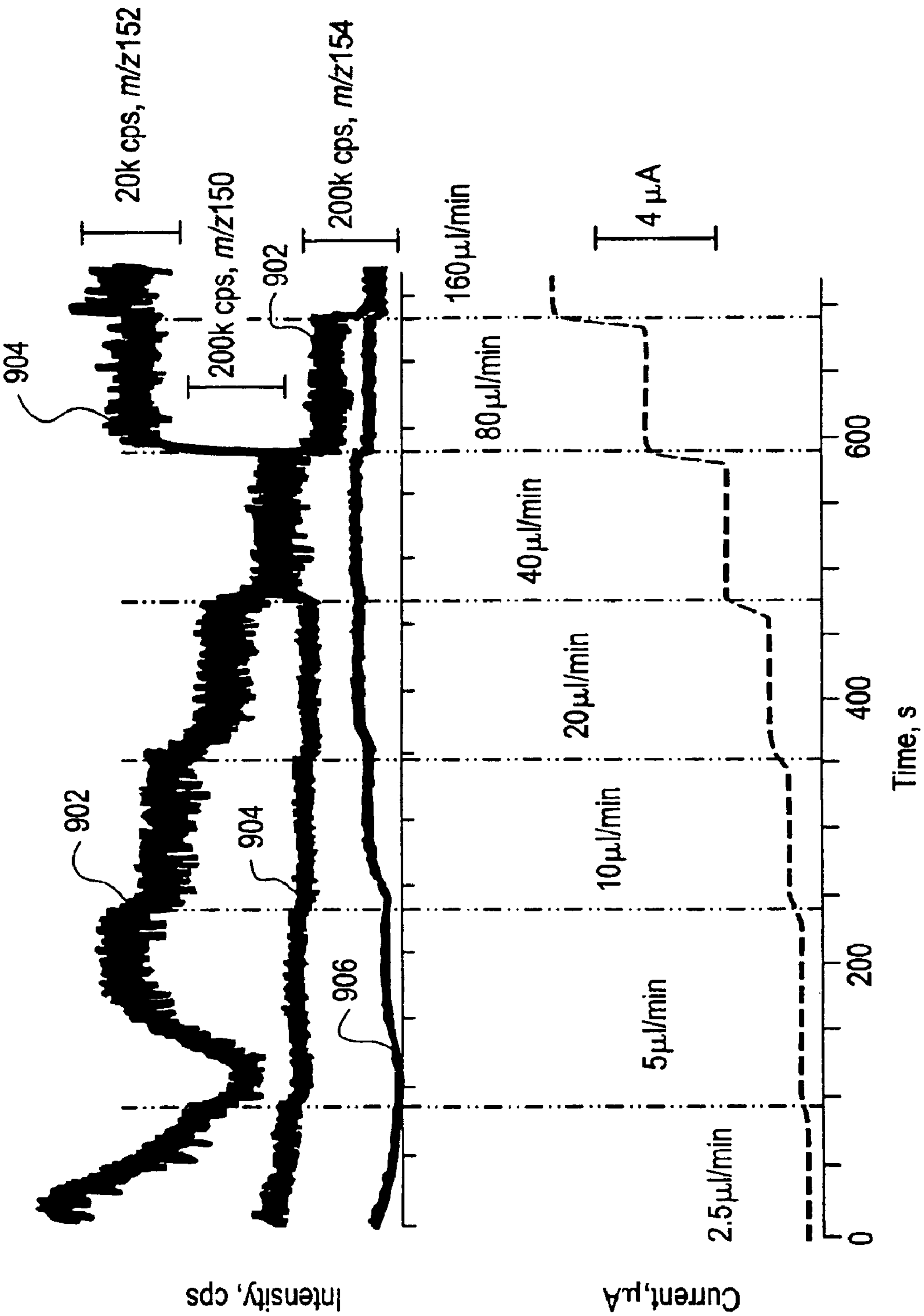
FIG. 9 shows the oxidation of dopamine based on flow rate using a porous electrochemical flow-cell.

Additionally, to better ascertain the ability of the porous cell to control oxidation of analytes at different flow rates, the capability of the porous cell to oxidize dopamine at flow rates ranging between 2.5 $\mu$L/minute to 160 $\mu$L/minute was tested. FIG. 9 shows the oxidation of dopamine based on flow rate at an electrically floating porous cell of +500 mV (with respect to a Palladium reference electrode and without adjusting this figure to Ag/AgCl reference electrode potential values), indicates that as the flow rate is increased, the abundance of the oxidized species of dopamine with a mass-to-charge ration of 150 (the curve labeled 902, corresponding to the dopamine species that loses 4 electrons and 4 protons) decreased. This decrease in the abundance of the m/z 150 oxidized species of dopamine was commensurate with a slight increase in the electrochemically reduced form of dopamine (the curve labeled 906, corresponding to a mass-to-charge ratio of 154). As can further be seen from FIG. 9, at flow rates greater than 40 $\mu$L/minute the m/z 152 oxidized species of dopamine (the curve labeled 904, corresponding to a dopamine species that loses 2 electrons and 2 protons) may be observed. However, the abundance of the m/z 152 dopamine at high flow rates is approximately 10% of the abundance of m/z 154 dopamine, and is likely the result of the competition of doparninequinone residence time at the electrode with its cyclization kinetics. Thus, as FIG. 9 indicates, at high flow rates electrochemical reactions at the porous cell are reduced due to the short exposure time of the analyte solution to the electrode(s) participating in the electrochemical processes, and therefore, by adjusting the working electrode potential, and/or the solution flow-rates, the extent of electrochemical reaction of compounds (e.g., dopamine) can be controlled, and/or altogether suppressed.

As FIGS. 6–9 demonstrate, use of a porous cell in electrospray processes enables control over the nature and extent of the electrochemical reactions taking place in the electrochemical cell, including suppression of undesired electrochemical reactions (e.g., suppression of unwanted oxidation back reactions yielding unwanted oxidized species of analyte compounds) by controlling, for example, the potential of the working electrode, controlling the flow rate of the solution through the porous cell, etc. By exercising such control over the nature of the electrochemical reactions that may take place inside the porous cells used in the electrospray process, better control can be obtained over the type of compounds (e.g., analytes) that may be delivered to a mass spectrometer apparatus, and/or other types of apparatus and equipment.

Thus, what has been disclosed herein are systems and methods that include a flow-cell that includes porous conductive material(s) that provides a working electrode(s), an inlet connected to the flow-cell to deliver a solution containing an analyte(s), an outlet connected to the flow-cell to allow the solution to exit the flow-cell, a counter electrode positioned proximate to the outlet, and a voltage source(s)

coupled to the working electrode(s) and the counter electrode. The methods can include delivering a solution containing an analyte(s) through an inlet to a flow-cell that includes porous conductive material(s) that provides a working electrode(s), connecting the flow-cell to an outlet for allowing the solution to exit the flow-cell, placing a counter-electrode proximate the outlet, and supplying a voltage from a voltage source(s) to the working electrode(s) and/or the counter-electrode.

The methods and systems described herein are not limited to a particular hardware or software configuration, and may find applicability in many computing or processing environments. The methods and systems can be implemented in hardware, or a combination of hardware and software, and/or can be implemented from commercially available modules applications and devices.

Unless otherwise stated, use of the word "substantially" can be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun can be understood to be used for convenience and to include one, or more than one of the modified noun, unless otherwise specifically stated.

Although the methods and systems have been described relative to a specific embodiment thereof, they are not so limited. Obviously many modifications and variations may become apparent in light of the above teachings. For example, as previously provided herein, although the figures illustrate the use of a single voltage source, more than one voltage source may be electrically coupled to the working electrode, outlet, counter electrode, and/or other parts and components of the exemplary embodiments of the electrospray apparatus described herein. Similarly, more than one potentiostat, where such a potentiostat is used, may be coupled to at least one of the working electrode, reference electrode, and/or the auxiliary electrode. Furthermore, more than one working electrode, reference electrode, and/or auxiliary electrode may be provided in a porous cell, and all such electrodes may be referred to or denoted by other names and/or terms. Additionally, as also previously provided herein, the ion source provided through the electrospray process implemented through the various non-limiting exemplary embodiments described herein can be presented to different types of apparatus and equipment other than mass spectrometry apparatus and equipment.

Many additional changes in the details, materials, and arrangement of parts, herein described and illustrated, can be made by those skilled in the art. Accordingly, it will be understood that the following claims are not to be limited to the embodiments disclosed herein, can include practices otherwise than specifically described, and are to be interpreted as broadly as allowed under the law.

What is claimed is:

1. An apparatus comprising:

a flow-cell including at least one porous conductive material, where the at least one porous conductive material provides at least one working electrode, an inlet connected to said flow-cell to deliver a solution to said flow-cell, where said solution contains at least one analyte, an outlet connected to said flow-cell to allow said solution to exit said flow-cell, a counter electrode positioned proximate to said outlet, and at least one voltage source coupled to said at least one working electrode and said counter electrode.

2. The apparatus of claim 1, where the at least one voltage source includes a first voltage source coupled to said at least one working electrode, and a distinct second voltage source coupled to said counter electrode.

3. The apparatus of claim 1, where said counter electrode is separated from said outlet of said flow-cell by a gap.

4. The apparatus of claim 1, where said at least one voltage source causes electrolysis of said solution in said flow-cell.

5. The apparatus of claim 1, where said at least one voltage source produces an electric field between said outlet and said counter electrode, said electric field promoting said electrostatic spray of said solution towards said counter electrode.

6. The apparatus of claim 1, where the counter electrode comprises an entrance to a mass spectrometer.

7. The apparatus of claim 6, where said mass spectrometer identifies at least some of the components in the sprayed solution.

8. The apparatus of claim 1, where said at least one porous conductive material includes at least one of: porous graphite, porous carbon, porous glassy carbon, porous conductive diamond, and porous metal electrode.

9. The apparatus of claim 1, where said outlet is electrically non-conductive.

10. The apparatus of claim 1, where said outlet is conductive.

11. The apparatus of claim 1, where said outlet is in electrical communication with said at least one working electrode.

12. The apparatus of claim 1, where characteristics of said at least one working electrode affect the electrolysis of said solution.

13. The apparatus of claim 12, where said characteristics of said at least one working electrode include at least one of: material, shape, size, and location within said flow-cell.

14. The apparatus of claim 12, where said electrolysis effects on said solution include at least one of: surface adsorption, selectivity, and efficiency.

15. The apparatus of claim 1, further comprising at least one device for measuring the current at said at least one working electrode.

16. An apparatus comprising:

a flow-cell including at least one porous conductive material, where the at least one porous conductive material provides at least one working electrode, said flow-cell further comprising at least one reference electrode, an inlet connected to said flow-cell to deliver a solution to said flow-cell, where said solution contains at least one analyte, an outlet connected to said flow-cell to allow said solution to exit said flow-cell, a counter electrode positioned proximate to said outlet, and at least one first voltage source coupled to said at least one working electrode.

17. The apparatus of claim 16, where said at least one first voltage source includes at least one of: a battery, a voltage divider, a galvanostat, and a potentiostatic device.

18. The apparatus of claim 16, where said at least one first voltage source causes electrolysis of said solution in said flow-cell.

19. The apparatus of claim 16, further comprising at least one second voltage source electrically coupled to at least one of: said outlet, and said counter electrode.

20. The apparatus of claim 19, where said at least second voltage source produces an electric field between said outlet and said counter electrode, said electric field promoting said electrostatic spray of said solution towards said counter electrode.

21. The apparatus of claim 19, where said at least one working electrode and said at least one reference electrode are electrically coupled to said at least one first voltage source, and where said outlet is electrically coupled to said at least one second voltage source, and where said working electrode is electrically decoupled from said outlet.

22. The apparatus of claim 16, where said flow-cell further comprises at least one auxiliary electrode, said at least one auxiliary electrode electrically coupled to said at least one first voltage source.

23. The apparatus of claim 16, where the counter electrode comprises an entrance to a mass spectrometer.

24. The apparatus of claim 23, where said mass spectrometer identifies at least some of the components in the sprayed solution.

25. The apparatus of claim 16, where said at least one porous conductive material includes at least one of: porous graphite, porous carbon, porous glassy carbon, porous conductive diamond, and porous metal electrode.

26. The apparatus of claim 16, where said outlet is electrically non-conductive.

27. The apparatus of claim 16, where said outlet is conductive.

28. The apparatus of claim 16, where said outlet is in electrical communication with said at least one working electrode.

29. The apparatus of claim 16, where characteristics of said at least one working electrode affect the electrolysis of said solution.

30. The apparatus of claim 29, where said characteristics of said at least one working electrode include at least one of: material, shape, size, and location within said flow-cell.

31. The apparatus of claim 29, where said electrolysis effects on said solution include at least one of: surface adsorption, selectivity, and efficiency.

32. The apparatus of claim 16, further comprising at least one device for measuring the current at said at least one working electrode.

33. The apparatus of claim 16, further comprising a second voltage source coupled to the first voltage source.

34. The apparatus of claim 33, wherein the second voltage source is also coupled to the counter electrode.

35. The apparatus of claim 34, wherein the reference electrode is coupled to the first voltage source.

36. The apparatus of claim 16, wherein the reference electrode is coupled to the first voltage source.

37. The apparatus of claim 16, wherein the reference electrode is coupled to the working electrode.

38. The apparatus of claim 37, further comprising a second voltage source coupled to the first voltage source.

39. The apparatus of claim 38, wherein the second voltage source is also coupled to the counter electrode.

40. A method, comprising:

delivering a solution through an inlet to a flow-cell, said solution containing at least one analyte, said flow-cell including at least one porous conductive material that provides at least one working electrode;

connecting said flow-cell to an outlet for allowing said solution to exit said flow-cell, placing a counter-electrode proximate said outlet; and supplying a voltage from at least one voltage source to at least one of said at least one working electrode and said counter-electrode.

41. The method of claim 40, where the at least one voltage source includes a first voltage source coupled to said at least one working electrode, and a distinct second voltage source coupled to said counter electrode.

42. The method of claim 40, where said counter electrode is separated from said outlet of said flow-cell by a gap.

43. The method of claim 40, where said at least one voltage source causes electrolysis of said solution in said flow-cell.

44. The method of claim 40, where said at least one voltage source produces an electric field between said outlet and said counter electrode, said electric field promoting said electrostatic spray of said solution towards said counter electrode.

45. The method of claim 40, where the counter electrode comprises an entrance to a mass spectrometer.

46. The method of claim 45, where said mass spectrometer identifies at least some of the components in the sprayed solution.

47. The method of claim 40, where said at least one porous conductive material includes at least one of: porous graphite, porous carbon, porous glassy carbon, porous conductive diamond, and porous noble metal electrode.

48. The method of claim 40, where said outlet is electrically non-conductive.

49. The method of claim 40, where said outlet is conductive.

50. The method of claim 40, where said outlet is in electrical communication with said at least one working electrode.

51. The method of claim 40, where characteristics of said at least one working electrode affect the electrolysis of said solution.

52. The method of claim 51, where said characteristics of said at least one working electrode include at least one of: material, shape, size, and location within said flow-cell.

53. The method of claim 51, where said electrolysis effects on said solution include at least one of: surface adsorption, selectivity, and efficiency.

54. The method of claim 40, farther comprising connecting to said at least one working electrode at least one device for measuring the current at said at least one working electrode.

55. A method, comprising:

delivering a solution through an inlet to a flow-cell, said solution containing at least one analyte, said flow-cell including at least one porous conductive material that provides at least one working electrode, said flow-cell further comprises at least one reference electrode;

connecting said flow-cell to an outlet for allowing said solution to exit said flow-cell;

placing a counter-electrode proximate said outlet; and supplying voltage from at least one first voltage source to said at least one working electrode.

56. The method of claim 55, where said at least one first voltage source includes at least one of: a battery, a voltage divider, a galvanostat, and a potentiostatic device.

57. The method of claim 55, where said at least one first voltage source causes electrolysis of said solution in said flow-cell.

58. The method of claim 55, further comprising at least one second voltage source electrically coupled to at least one of: said outlet, and said counter electrode.

59. The method of claim 58, where said at least second voltage source produces an electric field between said outlet and said counter electrode, said electric field promoting said electrostatic spray of said solution towards said counter electrode.

60. The method of claim 58, where said at least one working electrode and said at least one reference electrode are electrically coupled to said at least one first voltage source, and where said outlet is electrically coupled to said at least one second voltage source, and where said working electrode is electrically decoupled from said outlet.

61. The method of claim 55, where said flow-cell further comprises at least one auxiliary electrode, said at least one auxiliary electrode electrically coupled to said at least one first voltage source.

62. The method of claim 55, where the counter electrode comprises an entrance to a mass spectrometer.

63. The method of claim 62, where said mass spectrometer identifies at least some of the components in the sprayed solution.

64. The method of claim 55, where said at least one porous conductive material includes at least one of porous graphite, porous carbon, porous glassy carbon, porous conductive diamond, and porous metal electrode.

65. The method of claim 55, where said outlet is electrically nonconductive.

66. The method of claim 55, where said outlet is conductive.

67. The method of claim 55, where said outlet is in electrical communication with said at least one working electrode.

68. The method of claim 55, where characteristics of said at least one working electrode affect the electrolysis of said solution.

69. The method of claim 68, where said characteristics of said at least one working electrode include at least one of: material, shape, size, and location within said flow-cell.

70. The method of claim 68, where said electrolysis effects on said solution include at least one of: surface adsorption, selectivity, and efficiency.

71. The method of claim 55, further comprising connecting to said at least one working electrode at least one device for measuring the current at said at least one working electrode.

* * * * *